Dec. 11, 1962 — K. I. FANCHER — 3,067,770

TWO-WAY PRESSURE RESPONSIVE FLOW VALVE

Filed Oct. 29, 1959

INVENTOR.
KENNETH I. FANCHER
BY
Ernest L. Brown
Attorney

United States Patent Office 3,067,770
Patented Dec. 11, 1962

3,067,770
TWO-WAY PRESSURE RESPONSIVE FLOW VALVE
Kenneth I. Fancher, Elyria, Ohio, assignor, by mesne assignments, to Siegler, Inc., Santa Monica, Calif., a corporation of Delaware
Filed Oct. 29, 1959, Ser. No. 849,635
3 Claims. (Cl. 137—493)

This invention pertains to a valve, and more particularly to a valve of the charge and spill type.

The valve of this invention is of the type which is adapted to fit into a liquid or pneumatic line in order to charge the line on one side of the valve with pressure and to provide a release from the accumulation of extraordinarily high pressure.

Prior known valves of the charge and spill type utilize at least two springs, one to control each operation: the charge operation and the spill operation. The manufacture of these prior known devices is unduly complex.

The device contemplated by this invention utilizes a slidable valve seat and a slidable valve body having a fluted stem with a single spring positioned to apply a differential force between the valve body and the valve seat. During the charging operation of the valve of this invention, the valve body is held stationary against a stop and the valve is opened by pressure actuated movement of the valve seat against the bias of a spring. During the spill operation of the valve of this invention, the valve seat is held stationary against a stop and the valve body is pressure-actuated to open the valve against the bias of the spring.

Therefore, it is an object of this invention to provide a new and improved charge and spill valve.

It is another object of this invention to provide a novel valve which is adapted to accommodate a charging pressure and to relieve excessive pressures.

It is a further object of this invention to provide a valve with a differentially slidable seat and body which is adapted to operate as a combined check and release valve.

It is a more particular object of this invention to provide a valve with an axially slidable seat, an axially slidable body, and a single spring therebetween adapted to provide a differential force between said body and seat to bias thereby said valve into its closed position, and which is adapted to move said seat against said spring during a charging operation and to move said body against said spring during a pressure release operation.

Other objects will become apparent from the following description taken in connection with the accompanying drawings in which.

Figure 1:
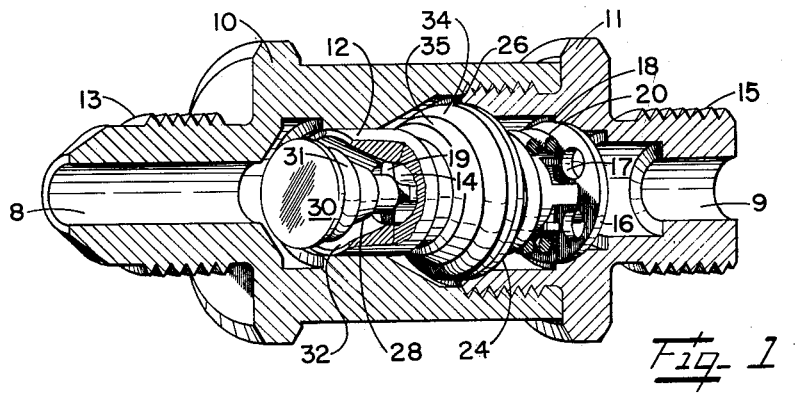
FIG. 1 is an oblique view, partially in section and partially in profile showing the structure of this invention.
Figure 2:
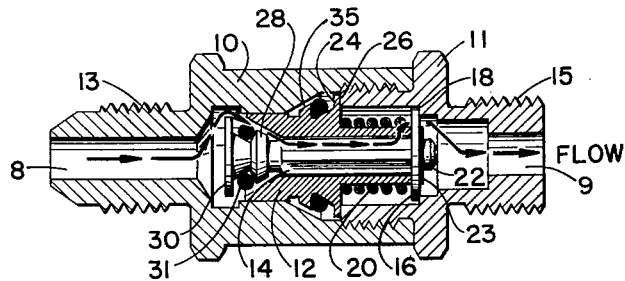
FIG. 2 is a view, partially in section, showing the valve of this invention opened during its charging operation.
Figure 3:
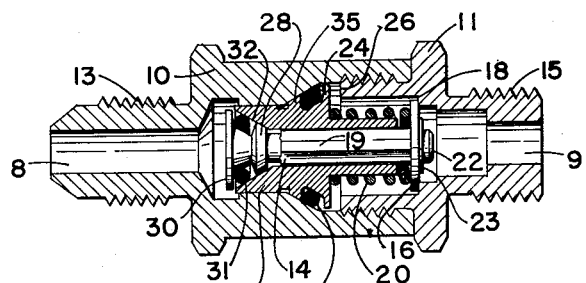
FIG. 3 is a view, partially in section, of the valve of this invention in its closed position.
Figure 4:
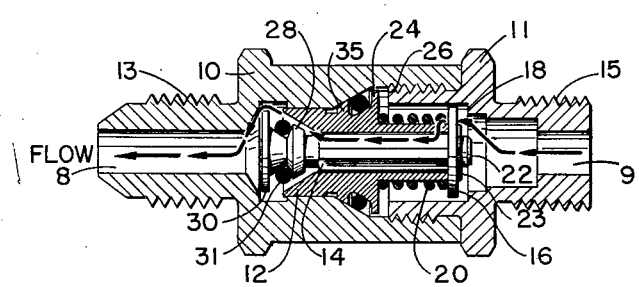
FIG. 4 is a view of the valve of this invention, partially in section, shown in its open position during the pressure release or spill operation.

In the figures, conduit 8 is adapted to receive a charging pressure, and conduit 9 is adapted to supply pressure to a controlled line or tank. Housing 10 and 11 are screwed together to inclose the valve mechanism. Threaded nipple 13 is adapted to receive a line attached to a source of liquid or gas. Threaded nipple 15 is adapted to be attached to a receiving line or tank. A sliding valve seat containing cylindrical member 12 is positioned within housing members 10 and 11 and is adapted to slide axially thereof between the extreme positions shown in FIGS. 2 and 3. Flange 24 is adapted to engage shoulder 26 when valve seat containing cylindrical member 12 is moved farthest to the right, as shown in FIG. 2. Flange 35 on the outer periphery of valve seat containing cylindrical member 12 is adapted to engage housing 10 when cylindrical member 12 is in its limiting position to the left in the direction of the conduit 8, as shown in FIGS. 3 and 4. Valve stem 14 is positioned coaxially with housing member 10 and 11 and with cylindrical member 12 and is adapted to slide in an axial direction relative to cylindrical member 12. Valve stem 14 is fluted by flutes (such as that at 19) to provide axial conduits for the liquid or gas controlled by the valve of this invention. A perforated washer 16 which has holes shown at 17 in FIG. 1 is snapped onto the end of valve stem 14 at 22 where stem 14 is generally of a circular cylindrical shape. Washer 16 then is positioned against the flutes of stem 14 to provide a conduit means for liquids and gases and, simultaneously, to provide a bearing plate for coil spring 20. Coil spring 20 is compressed between washer 16 and flange 24 of cylindrical member 12 to bias cylindrical member 12 to the left toward conduit 8 and to bias valve stem 14 to the right toward conduit 9. Valve body 28 upon the left end of valve stem 14 is adapted to fit into the left end of cylindrical member 12 together with O ring 31 to open and close the valve of this invention in accordance with differential axial movement between cylindrical member 12 and valve head 28. Retaining cap 30 is adapted to hold O ring 31 onto valve body 28.

In operation, when the pressures at both conduit 8 and conduit 9 are insufficient to operate the valve, the valve is closed as shown in FIG. 3 and is maintained in its closed position by the biasing action of coil spring 20 against flange 24 and washer 16. It is to be noted that valve head 28, valve stem 14, and washer 16 are rigidly connected together and that spring 20 pushes washer 16 to the right which tends to push valve head 28 and O ring 31 against valve seat 12 to close the valve. The limiting motion of valve head 28, valve stem 14, and washer 16 is determined by shoulder 18. Spring 20 also biases cylindrical member 12 to the left. The limiting left position of cylindrical member 12 is determined when valve seat 12 and O ring 34 come into contact with housing member 10. The right hand limiting position of cylindrical member 12 is determined when flange 24 is arrested by shoulder 26.

When it is desirable to charge the line or tank connected to conduit 9 with liquid or gase, a pressure is applied to conduit 8, which acts on the annular area between the two O rings 31 and 34. The pressure applied between O rings 31 and 34 upon cylindrical member 12 causes cylindrical member 12 to move to the right into the position shown in FIG. 2. When valve seat 12 moves into the position shown in FIG. 2, liquid or gas flows through the valve and along the valve stem between the flutes thereof, thence through perforations 17 in washer 16 into conduit 9, as shown by the flow arrows in FIG. 2. When the pressure in conduit 9 reaches a predetermined value, the differential pressure between the right and left-hand surfaces of valve seat 12 is insufficient to overcome the biasing action of spring 20 and the valve of this invention then recloses as shown in FIG. 3.

When gases or fluids are heated, the pressure frequently rises to extremely high values. It is not intended, however, that the valve of this invention should be limited to use on fluid systems wherein high pressure in conduit 9 arises only from thermal expansion. When the pressure in conduit 9 reaches a predetermined high value, the force of the right hand pressure upon the portion of valve head 28 radially interior to O ring 31 causes valve body 28 to move to the left, toward conduit 8, relative to valve seat 12 thereby to open the valve and cause a flow of liquid or gas in accordance with the flow arrows of FIG. 4.

The spill flow is through perforations 17, thence along the channels between the flutes of valve stem 14, thence through the valve between valve body 28 and valve seat 12, thence into conduit 8.

In one typical design, a typical charging pressure which may be applied to the valve during the charging mode, as shown in FIG. 2, is 20 lbs. With the same valve design, a typical relief pressure at which the valve operates as shown in FIG. 4 might be 60 lbs. per square inch.

It is to be noted that the fluted shape of the valve stem is not critical. What is necessary is that conduit means of some kind be provided to carry fluid through the valve body and seat when the valve is opened.

Thus, the charge and fill valve of this invention is a relatively simple structure which is easily manufactured and which is adapted to efficiently charge a liquid or gas line and provide pressure relief therein.

Although the device of this invention has been described in some particular detail herein, it is not intended that the invention should be limited by the description hereof, but only in accordance with the spirit and scope of the following claims:

I claim:

1. In combination:
   (a) a valve housing including an inlet conduit at one end and an outlet conduit at the other end;
   (b) a chamber in said housing intermediate said conduits;
   (c) said housing having on its inner surface in said chamber
       (c, i) a first valve seat,
       (c, ii) a first shoulder and
       (c, iii) a second shoulder extending radially inwardly further than said first shoulder, and wherein said first shoulder is located intermediate said second shoulder and said first valve seat;
   (d) a cylindrical member having a first end adjacent said inlet conduit and a second end adjacent said outlet conduit, slideably mounted in said chamber;
   (e) said cylindrical member having
       (e, i) a bore therethrough from said first end to said second end,
       (e, ii) a second valve seat at its first end, and
       (e, iii) a first valve seat engaging portion located on the outer peripheral surface intermediate said first and said second ends and adapted to engage said first valve seat, and
       (e, iv) a radially outwardly extending flange intermediate said first valve seat engaging portion and said second end of said cylindrical member adapted to abut against said first shoulder on the inner surface of said casing when said cylindrical member moves in an axial direction away from said first valve seat;
   (f) a valve member having a valve head and a valve stem positioned in said bore of said cylindrical member
       (f, i) said valve head having a second valve seat engaging portion thereon adapted to engage said second valve seat on said cylindrical member
       (f, ii) said valve stem having an end extending beyond said second end of said cylindrical member;
   (g) a retaining member having a plurality of perforations therein, mounted on said end of said valve stem and adapted to abut against said second shoulder in said housing, and being limited in axial travel by said second shoulder on one side and by said second end of said cylindrical member on the other side.
   (h) spring means positioned between said flange and said retaining means and biased to urge said retaining member away from said cylindrical member and thereby urging said second valve seat engaging portion on said valve head against said second valve seat whereby in response to pressure in said inlet conduit, said cylindrical member will move against the bias of said spring member and away from said second valve seat engaging portion on said valve head, permitting fluid to flow from said inlet conduit past said valve head, past valve stem, through said perforations in said retaining member and to said outlet conduit; and whereby in response to fluid pressure in said outlet conduit, pressure will be applied against the base of said valve head causing said valve head to move against the bias of said spring member and away from said valve seat in said cylindrical member, permitting fluid to spill from said outlet conduit through said perforations in said retaining member, past said valve stem, past said valve head and out to said inlet conduit.

2. The combination of claim 1 wherein said valve stem consists of a flute construction permitting ready passage to fluid therearound.

3. The combination of claim 2 wherein said valve head has
   (j) a retaining cap attached thereto through a necked-down stem providing a sealing member retaining first groove between said retaining cap and said valve head;
   (k) a sealing member in said groove, adapted to contact said second valve seat in said cylindrical member in response to the action of said spring means biased to urge said valve member and said cylindrical member; in opposite directions and
   (l) a sealing member retaining second groove on the outer peripheral surface of said cylindrical member adjacent said first valve seat engaging portion, and
   (m) a seal retaining member in said second groove adapted to contact said first valve seat when said first valve seat engaging portion contacts said first valve seat.

References Cited in the file of this patent

UNITED STATES PATENTS

| | | |
|---|---|---|
| 2,681,074 | Frentzel | June 15, 1954 |
| 2,804,881 | Seid et al. | Sept. 3, 1957 |
| 2,888,947 | Montgomery | June 2, 1959 |